Nov. 29, 1938.  C. C. STRANGE  2,138,620
VULCANIZING DEVICE
Original Filed Dec. 13, 1932  4 Sheets-Sheet 1

INVENTOR.
Charles C. Strange

Nov. 29, 1938.　　　　C. C. STRANGE　　　　2,138,620
VULCANIZING DEVICE
Original Filed Dec. 13, 1932　　4 Sheets-Sheet 2

INVENTOR.
Charles C. Strange

Nov. 29, 1938.                    C. C. STRANGE                    2,138,620
                                VULCANIZING DEVICE
                        Original Filed Dec. 13, 1932       4 Sheets-Sheet 3

INVENTOR.
Charles C. Strange.

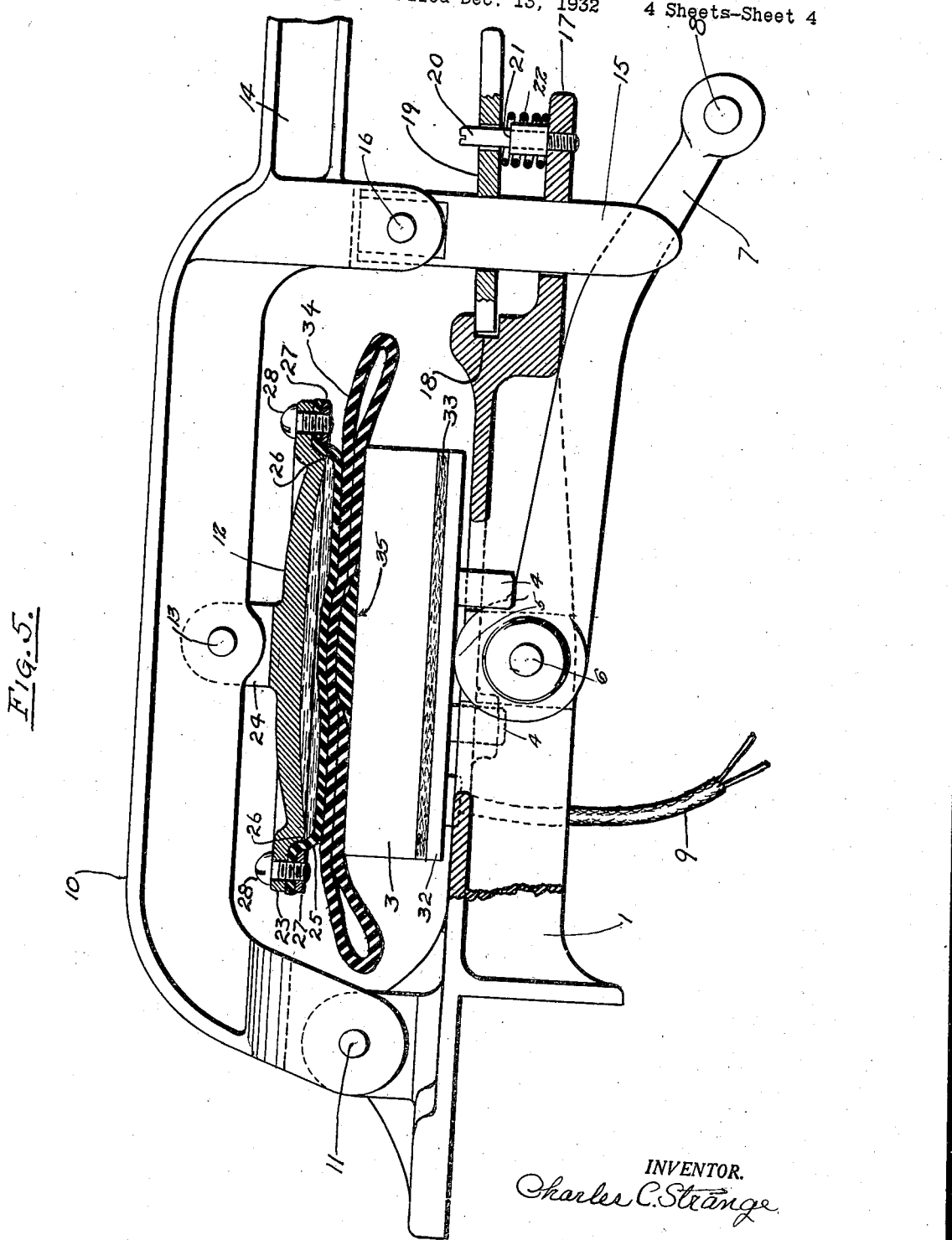

Patented Nov. 29, 1938

2,138,620

UNITED STATES PATENT OFFICE 2,138,620

VULCANIZING DEVICE

Charles C. Strange, Port Richmond, Staten Island, N. Y., assignor of seventeen and one-half per cent to Eric J. Pilblad and seventeen and one-half per cent to Bess Aaronson, both of Meriden, Conn., and seventeen and one-half per cent to Alan J. McIntosh, seventeen and one-half per cent to Alvan L. Barach, and twelve and one-half per cent to Edmund J. Barach, all of New York, N. Y.

Substitute for abandoned application Serial No. 646,987, December 13, 1932. This application May 24, 1937, Serial No. 144,485

12 Claims. (Cl. 18—18)

This invention relates to improvements in vulcanizing devices for vulcanizing patches upon inner tubes for automobile tires or for repairing other articles made from rubber or similar substances which are adapted to be joined together by the vulcanizing process. This application is a substitution of my application Serial No. 646,987, filed December 13, 1932.

The general object of the invention is to provide simple means for obtaining a high and equalized pressure over the area being vulcanized, the equalized pressure being obtained by the application of the well-known principle, that a liquid or plastic material, due to its flowability, transmits pressure in every direction.

Another object of the invention is to provide a vulcanizing device with a movable arm, to which is attached an equalizing element, and locking means which will automatically lock the said movable arm and equalizing member in the exact vulcanizing position required by the thickness of the material to be vulcanized.

A further object of the invention is to provide simple means whereby the necessary high vulcanizing pressure required can be quickly and easily attained without the operator's having to apply intense manual pressure on levers or springs, or without the use of tubular connections to a source of liquid or pneumatic pressure which necessarily involves expensive and heavy equipment.

A still further object of the invention is to provide an improved vulcanizing device which will be safe, efficient and durable, simple in construction and, therefore, low in cost of manufacture.

The above and further objects and novel features of the present invention will more fully appear from the following detailed description, which is to be read in connection with the accompanying drawings. It is to be expressly understood, however, that the drawings are for the purpose of illustration only and are not designed as a definition of the limits of the invention, reference being primarily had for this purpose to the appended claims.

In the drawings, wherein like reference characters refer to like parts throughout the several views, Fig. 1 shows a side elevation of the improved vulcanizing device as attached to a work bench or table;

One embodiment of the invention is illustrated in the accompanying drawings, by way of example, in the form of a tire vulcanizer comprising a frame adapted to be attached to a bench and to be associated with an arm pivotally attached to the frame in such a manner that a diaphragm constituting a pressure equalizing unit pivotally attached to said arm may be pressed against a heating element movably mounted on the frame. Said pivoted arm portion of the frame with the attached equalizing unit may be locked against the heating element with the article to be vulcanized therebetween. Manually operable pressure applying cam means located below the frame are effective to urge the movable heating element against the locked pressure equalizing unit during the vulcanizing process.

Figure 1:
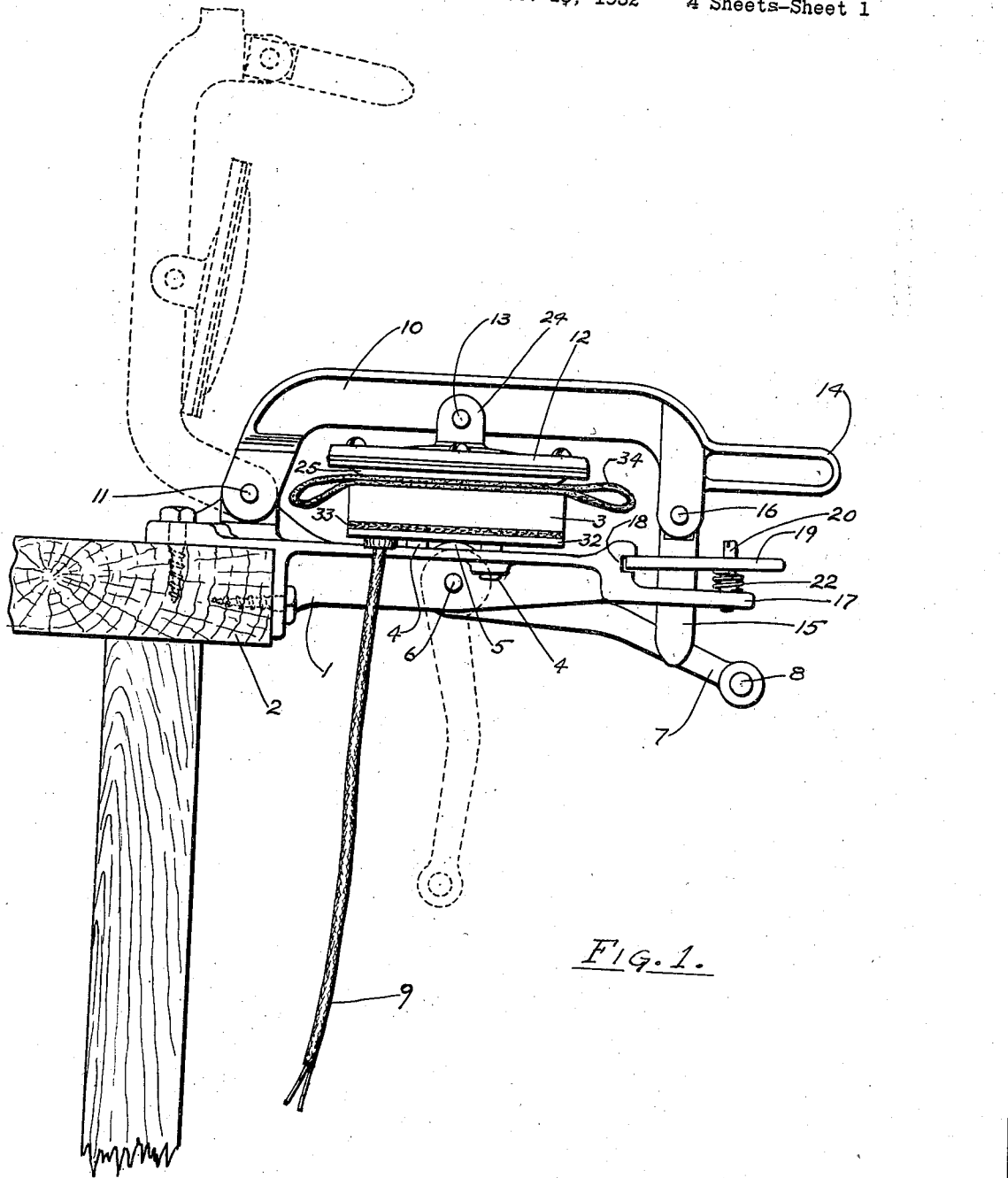
Figure 2:
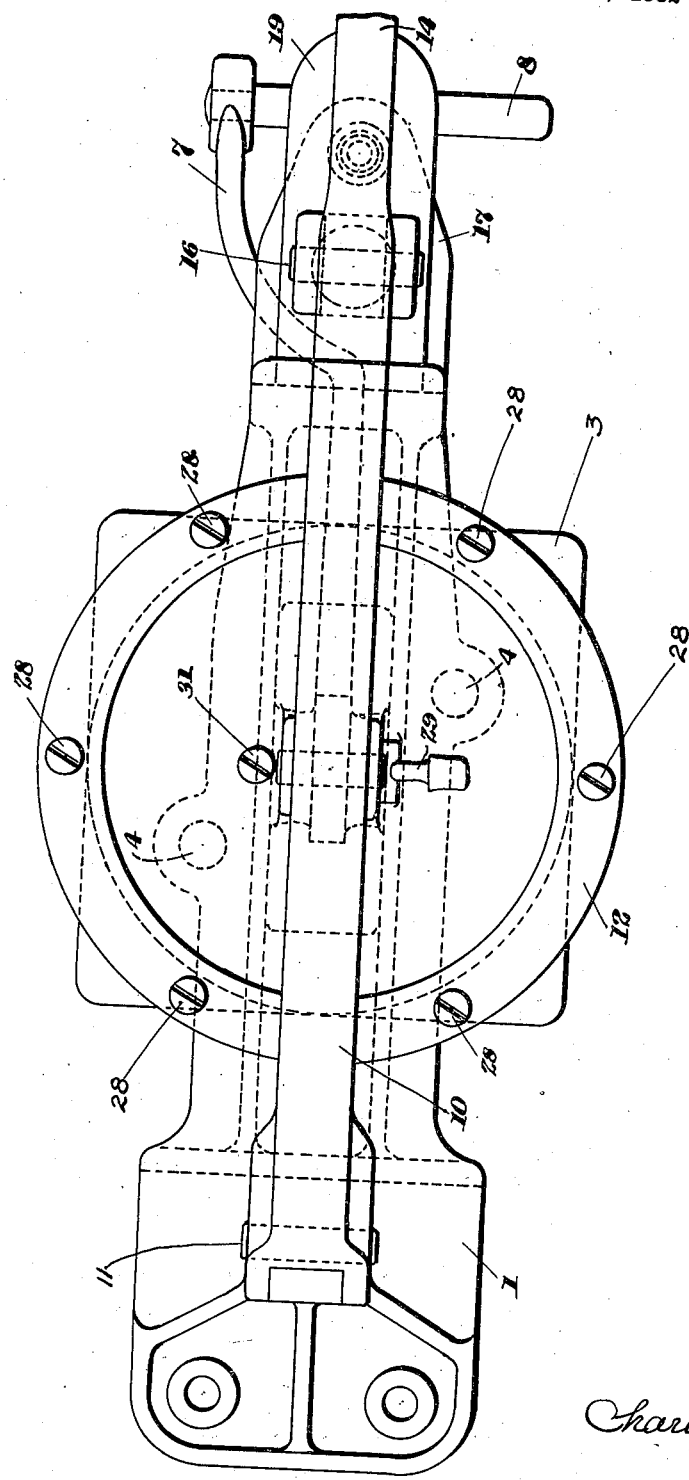
Fig. 2 is a plan view of the device.

Referring to the accompanying drawings illustrating a practical embodiment of the invention, 1 indicates the main frame of the device in a form adapted to be attached to the work bench 2. An electric heating element 3 is mounted on the frame 1 by pins 4 rigidly attached to the heating element 3 and adapted to fit loosely in suitable holes in frame 1. The heating element consists of a hollow box preferably composed of a metal of high thermal conductivity, as an aluminum alloy. The said box is provided with a preferably flat surface for heating the article to be treated and so designed as to easily withstand pressures of approximately 75 pounds per square inch. The source of the heat is a standard electric heating coil, thermostatically controlled to keep the temperature constant within a few degrees of the temperature usually required for vulcanization, i. e., approximately 300°. The intense pressure imparted to the movable heating element by the cam 5 is sustained by a hardened steel plate 32 which is attached to the bottom of said heating element. Between heating element 3 and steel plate 32 is placed an asbestos sheet 33 which acts to insulate the heat of element 3. Cam 5 is mounted pivotally by a pin 6 to said frame in such a manner that, when the same is rotated approximately 90° by lever 7, it will raise the heating element a predetermined amount. A standard electric connection 9 is provided and is adapted to be plugged into the conventional electric socket. A clamping arm 10 is pivotally mounted on frame 1 by a pin 11 in such a way that the said arm can rotate on pin 11 through an arc of approximately 90°, as shown by the dotted outline in Fig. 1. The pressure equalizing element 12 is pivotally attached to the clamping arm 10 by a pin 13 in such a position that its geometric center will coincide with that of the heating element 3 when the said arm is in the operating position. Clamping arm 10 is provided with a handle 14 to facilitate its raising or lowering. To the outer end of clamping arm 10 is pivotally attached a locking plunger 15 and the outer end of frame 1 is provided with a shelf-like extension 17, which is provided with a hole in line with and adapted to freely admit plunger 15 when clamping arm 10 is brought down to its operating position. Associated with frame 1 at the outer end thereof and above the shelf-like extension 17 is a locking member or pawl 19 which is pivotally supported on frame 1 in a slot 18. Said pawl is also provided with a hole of sufficient size to allow a free sliding fit for the plunger 15 when said pawl and plunger are at right angles to each other. However, said hole is small enough so that pawl 19 will effect a frictional locking of plunger 15 when moved a fraction of a degree from its right angular position. The hole in extension 17 holds the plunger 15 in a vertical position. A retaining stud 20 is provided for pawl 19. Said stud is also provided with a shoulder 21 in line with the lower edge of slot 18 so that, when pawl 19 is pressed down against the shoulder, it assumes a position at right angles to the plunger 15, thus allowing free movement of said plunger through the hole in pawl 19. A spring 22 is provided to normally hold pawl 19 in tilted locking position, thus keeping the clamping arm 10 locked to frame 1 against the pressure tending to separate the two.

Figure 3:
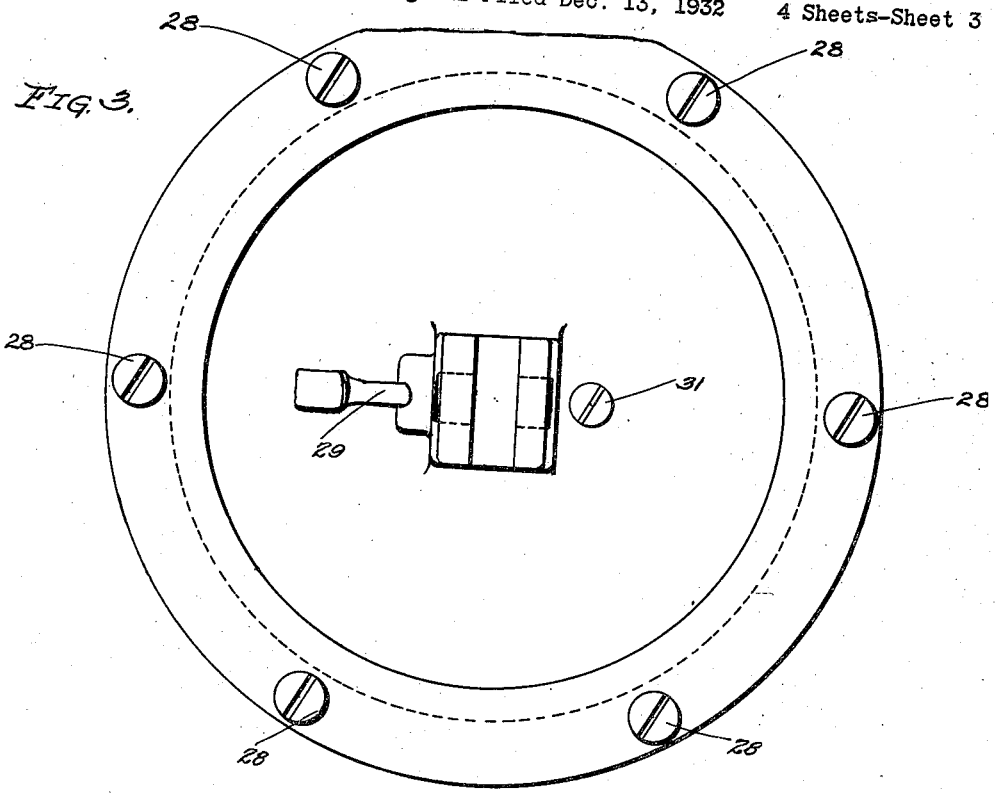
Fig. 3 is a plan view of the pressure equalizing unit.
Figure 4:
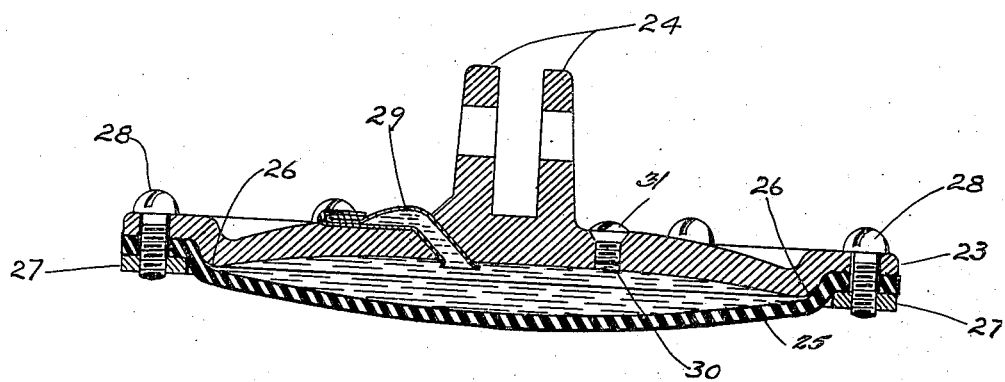
Fig. 4 is a cross sectional view of the pressure equalizing unit, the section being taken on line A—B of Fig. 3; and, Fig. 5 shows a side elevation of the device partly in section to illustrate the interrelation and functioning of the several parts.

The pressure equalizing unit 12 consists of a rigid container or back plate 23 (Figs. 3 and 4) preferably of a circular outline and having two lugs 24 for attaching the same to the clamping arm 10. The inside face of container 23 is slightly concave and over this concave face is stretched a diaphragm 25 composed of a flexible elastic substance. It has been found that one of the best suited materials for this purpose is sheet rubber packing intended for packing steam joints. Diaphragm 25 is stretched over an annular ridge 26 on the face of the container 23 and clamped into place by clamping means 27 comprising a ring held by screws 28. The distance between the outside diameter of annular ridge 26 and the inside diameter of clamping ring 27 is designed to be slightly less than the thickness of the diaphragm 25 so that, when ring 27 is held in close engagement by screws 28, a fluid-tight joint is formed between flexible diaphragm 25 and the outside diameter of ridge 26. A copper or brass tube 29 may be provided in communication with the chamber between diaphragm 25 and plate 23 through an opening in the rigid plate, said tube to be used for filling the pressure equalizer with a suitable plastic material. Tube 29 is preferably provided with suitable valve means assuring a fluid-tight seal of the said chamber.

In order to permit the escape of air to facilitate the filling of the equalizing unit, an air bleed port 30 is provided. It is desirable that substantially all air be expelled from the chamber formed by member 23 and the diaphragm 25, when said chamber is filled with liquid or plastic. When the unit is filled, the diaphragm 25 assumes a slightly convex shape and the sealing screw 31 closes the air bleed port 30 after all of the air is expelled. The tube 29 may be sealed, for example, in lieu of valve means, by flattening and crimping the end thereof extending externally of said chamber. It has been found that a plastic consisting of a mixture of diatomaceous earth and glycerine or a liquid mixture of the nature of ethylene glycol gives very satisfactory results as the substance with which to fill the pressure equalizing unit. However, any plastic or liquid that will not decompose when subjected to temperatures of approximately 300° F. and the boiling point of which is in excess of 300° F. is equally well adapted for this purpose.

It is well known in the art that in making a patch in a rubber article or in joining rubber to rubber or rubber to fabric by the vulcanizing process, application of heat and pressure to the area to be vulcanized is necessary.

In many vulcanizing devices now in use, the pressure is applied to a wooden or semi-hard rubber block placed over the area to be vulcanized which is effective to force the patch or joint down against a heated supporting surface. The pressure by this method is concentrated on the high points of the joint or patch and leaves large areas under inadequate pressure with a consequent unsatisfactory finished patch both as to durability and appearance. There is also another and superior method in use, where equalized gas pressure is exerted over the area to be vulcanized. This method produces good results and employs, usually, a hollow rubber pad that is connected to a supply of compressed air. While this method produces substantially perfect results, it is expensive to install and offers a hazard to property and operating personnel because of the possibility of explosion which may occur when in operation or when the compressed air is admitted to the apparatus when the rubber equalizing unit is in an unsupported position.

The present invention provides a novel vulcanizing device whereby equalized pressure is safely obtained without the use of high gaseous pressures with its attendant dangers and expense.

In operation, the heating element 3 may be connected to a suitable supply of electric energy and brought to the proper temperature while clamping arm 10 is held in the raised position. The material to be patched is prepared in the usual way by tapering the edges of the hole, and roughing and cleaning the adjacent area. The rubber cement is then applied to the surface of the material and, after the cement has become tacky, the hole is filled and built up with the usual vulcanizing rubber stop. The material, as, for example, a tire tube 34 (Fig. 5) with the area to be patched thus prepared is now placed with the patch 35 against the heating element. The clamping arm 10 is then lowered until the flexible face 25 of the pressure equalizing unit rests upon the top of the tube by its own weight. As before pointed out, clamping arm 10 is automatically locked against upward movement by a pawl 19 coacting with plunger 15. The heating element 3 which is movably mounted upon the frame is now urged toward the locked pressure equalizing unit with the tube therebetween by means of cam 5 which is actuated by lever 7. If desired, a fluid pressure gauge may be provided upon member 23 having communication with the pressure equalizing chamber. Thus, by means of the manually operable cam, the exact desired pressure may be attained.

The effect produced on diaphragm 25 of the pressure equalizing unit by raising the heating element is to compress the convex crown until the diaphragm conforms with the surface of the material being treated. As the diaphragm is being compressed, it will at once tend to compress the enclosed plastic or liquid and thus set up an equalized pressure as the heating element is forced upward, so that the pressure will remain constant after the heating element has come to rest in its working position.

The contour of the curve of cam 5 is so designed that the movement of the heating element is rapid at the beginning of the movement of the lever 7 when the liquid or plastic pressure is low. However, the movement of said element becomes progressively slower as the pressure in the equalizing unit increases. It has been determined by experiment that there is required a maximum of approximately 15 pounds applied to the handle 8 to raise the pressure in the equalizing unit to 75 pounds per square inch (approximately). It has been determined also that a minimum pressure of approximately 40 pounds per square inch in the equalizing unit is necessary to obtain the best results.

After the vulcanization is completed, lever 7 is brought to a vertical position, thus lowering the heating element 3 to its original position. The locking pawl 19 is then pressed down against the shoulder 21, thus releasing plunger 15 and allowing the clamping arm 10 to be raised to the vertical position. Tube 34 can now be easily removed.

There is thus provided a novel vulcanizing device which may be used for patching holes in the tubes of automobile tires or other rubber surfaces and which is safe in operation, easy to manipulate, and which safely attains an equally distributed high vulcanizing pressure, but which avoids the use of high gaseous pressures which may endanger personnel and property.

Although only a single embodiment of the invention has been illustrated and described in detail, it is to be expressly understood that the same is not limited thereto. For example, in the form shown, the heating element supports the article to be vulcanized and is beneath the pressure equalizing unit. However, this construction may be reversed. Various other changes may be made in the size and shape of the device illustrated, without departing from the spirit and scope of the invention, as will now be apparent to those skilled in the art. For a definition of the limits of the invention, reference is had primarily to the appended claims.

What is claimed is:

1. A tire tube vulcanizing device of the character described comprising a frame, a heating element movably mounted upon said frame and adapted to support the article to be subjected to the vulcanizing action, a pressure equalizing unit having a chamber filled with a substantially non-compressible substance adapted to flow readily under pressure disposed for positioning above said element and over the article supported thereon, means for securing said unit to the frame for temporarily locking the former against movement away from the latter, and manually operable pressure applying means associated with the frame and acting upon said element to force the latter with the article supported thereon against said pressure equalizing unit.

2. A vulcanizing device of the character described comprising a frame, a heating element movably mounted upon said frame and adapted to support the article to be subjected to the vulcanizing action, a pressure equalizing unit pivotally connected to the frame for positioning above said element and over the article supported thereon, means between said unit and frame for locking the same against relative movement, and pressure applying means pivoted to the frame and acting upon said element to force the latter with the article supported thereon against said pressure equalizing unit.

3. A vulcanizing device of the character described comprising a frame, a heating element movably mounted upon said frame and adapted to support the article to be subjected to the vulcanizing action, a pressure equalizing unit disposed for positioning above said element and over the article supported thereon, said unit including a rigid plate, a diaphragm positioned over one face of said plate and having its marginal portion secured thereto in a leak-proof manner, and an incompressible substance adapted to flow readily under pressure filling the space between the plate and diaphragm and hermetically sealed therein, means for securing said unit to the frame for temporarily locking the same against divergent movement, and pressure applying means associated with the frame and acting upon said element to force the latter with the article supported thereon against said pressure equalizing unit.

4. In a vulcanizing device, a pressure equalizing unit comprising a rigid member, a flexible element associated with said member to form a substantially non-fluid-tight chamber, and a substantially non-compressible plastic adapted to flow readily under pressure confined in and filling said chamber.

5. A vulcanizing device wherein one side of an article to be vulcanized is adapted to be held by pressure means in contact with a heating element, the combination therewith of a pressure equalizing unit comprising a base plate, a flexible member associated with said plate and adapted to contact the other side of said article, said plate and member constituting the walls of a fluid-tight chamber, and a substantially non-compressible plastic material adapted to flow readily under pressure confined in and filling said chamber.

6. In a vulcanizing device, a heating element, means for heating said element, a pressure equalizing unit including a hollow casing having deformable sides, a non-compressible plastic substance adapted to flow readily under pressure confined in and filling said casing, and mechanical pressure means for clamping an article to be vulcanized between said element and said casing.

7. In a vulcanizing device wherein an article to be repaired is adapted to be clamped between a heating element and a pressure equalizing unit, wherein said element is mounted on a stationary frame and wherein said unit is mounted upon a pivoted clamping arm, the combination with said arm of locking means therefor comprising a pin depending from said arm, a locking member pivotally mounted on said frame, said member having an opening therein to receive said pin, and means for normally holding said locking member in a position to prevent movement of said pin in one direction along the longitudinal axis of the same.

8. A vulcanizing device comprising a frame, a heating element mounted on the frame and adapted to be moved relative thereto, means for heating said element, a pressure equalizing unit, a clamping arm pivoted on said frame and adapted to move said unit toward and away from said element, means for locking said arm against movement in one direction, and means for applying pressure to said element to urge the latter toward said unit.

9. A vulcanizing device of the character described, comprising a frame, a clamping arm pivotally mounted on said frame, heating means mounted on said frame, pressure equalizing means mounted on said clamping arm, and means for locking the latter in operating position, said locking means including a rod pivotally suspended from the free end of said clamping arm, a locking pawl pivotally supported on said frame, said pawl having an opening therein slightly larger than said rod and adapted to slidably receive the latter when said pawl and rod are at right angles to each other, and resilient means for normally tilting said pawl relative to said rod for locking the latter against movement in one direction.

10. A vulcanizing device of the character described, comprising means for applying pressure and heat to the area of the material to be vulcanized, and a pressure equalizing unit for distributing the pressure equally over said area, said unit including a rigid plate having an annular ridge protruding from one surface thereof, a shelf outside of said ridge, an elastic diaphragm stretched over said ridge, a ring secured to said shelf and holding said diaphragm in position, the distance between said ring and ridge being slightly less than the thickness of the diaphragm, and a liquid or a plastic filling the chamber between said plate and diaphragm.

11. In a vulcanizing device, a pressure equalizing unit comprising a rigid pressure transmitting element, a container having a flexible wall associated with said element, and a plastic material adapted to flow readily under pressure confined in said container.

12. In vulcanizing apparatus, a heating element, a pressure transmitting unit comprising a container having a flexible wall, pressure applying means for urging said container and heating element toward each other, and a mixture comprising a finely pulverized solid and a liquid having a high boiling point confined in said container for transmitting pressure between said heating element and pressure applying means.

CHARLES C. STRANGE.